United States Patent
Liu et al.

(10) Patent No.: US 10,742,121 B2
(45) Date of Patent: Aug. 11, 2020

(54) BOOT STRAP CAPACITOR CHARGING FOR SWITCHING POWER CONVERTERS

(71) Applicant: DIALOG SEMICONDUCTOR INC., Campbell, CA (US)

(72) Inventors: Wenduo Liu, Campbell, CA (US); Cong Zheng, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 16/024,659

(22) Filed: Jun. 29, 2018

(65) Prior Publication Data
US 2020/0007041 A1 Jan. 2, 2020

(51) Int. Cl.
*H02M 3/335* (2006.01)
*H02M 1/08* (2006.01)
*H02M 1/00* (2006.01)
*H02M 1/34* (2007.01)

(52) U.S. Cl.
CPC ......... *H02M 3/33507* (2013.01); *H02M 1/08* (2013.01); *H02M 2001/0006* (2013.01); *H02M 2001/342* (2013.01)

(58) Field of Classification Search
CPC ............. H02M 3/335; H02M 3/33523; H02M 3/33569; H02M 3/33507; H02M 1/34; H02M 2001/342; H02M 2001/344; H02M 2001/0006; H02M 3/33561; H02M 2001/0058; H02M 1/08; H02M 3/33538
See application file for complete search history.

(56) References Cited

U.S. PATENT DOCUMENTS

| | | | | |
|---|---|---|---|---|
| 6,295,213 B1* | 9/2001 | Smith | ............... | H02M 3/33569 363/21.01 |
| 7,466,168 B1* | 12/2008 | Wittenbreder, Jr. | ......................... | H03K 17/063 327/108 |
| 7,589,571 B1* | 9/2009 | Wittenbreder, Jr. | ......................... | H02M 3/1588 327/108 |
| 10,243,451 B1* | 3/2019 | Knoedgen | ............ | H03K 17/223 |
| 10,333,381 B1* | 6/2019 | Cui | ......................... | H02M 1/08 |
| 10,389,259 B2* | 8/2019 | Asano | ............... | H02M 3/33569 |
| 2005/0201128 A1* | 9/2005 | Jin | ......................... | H02M 1/08 363/56.01 |
| 2005/0285661 A1* | 12/2005 | Wittenbreder, Jr. | .... | H02M 1/08 327/434 |
| 2006/0119281 A1* | 6/2006 | Nishikawa | .......... | H02M 3/3353 315/209 R |
| 2006/0146584 A1* | 7/2006 | Aso | ................... | H02M 3/33507 363/95 |
| 2007/0070659 A1* | 3/2007 | Sawtell | .................. | H02M 1/088 363/21.01 |
| 2008/0129372 A1* | 6/2008 | Rozsypal | ................ | H02M 3/07 327/536 |

(Continued)

*Primary Examiner* — Gustavo A Rosario-Benitez
(74) *Attorney, Agent, or Firm* — Haynes and Boone, LLP (57) ABSTRACT

A first charging path is provided for the charging of an a bootstrap capacitor that stores a driver power supply voltage for driving an active clamp switch transistor in a flyback converter. The first charging path couples charge from an active clamp capacitor to charge the bootstrap capacitor. A power supply capacitor stores a power supply voltage for a controller of a power switch for the flyback converter. A second charging path couples charge from the power supply capacitor to charge the bootstrap capacitor.

8 Claims, 8 Drawing Sheets

(56) References Cited

U.S. PATENT DOCUMENTS

| | | | |
|---|---|---|---|
| 2008/0278135 A1* | 11/2008 | De Lima Filho | G05F 1/575 |
| | | | 323/288 |
| 2011/0194313 A1* | 8/2011 | Yoshinaga | H02M 3/33569 |
| | | | 363/21.12 |
| 2012/0212981 A1* | 8/2012 | Lin | H02M 3/33507 |
| | | | 363/21.15 |
| 2013/0241621 A1* | 9/2013 | Forghani-Zadeh | H03K 17/08122 |
| | | | 327/315 |
| 2016/0105173 A1* | 4/2016 | De Rooij | H03K 17/6871 |
| | | | 327/109 |
| 2016/0149569 A1* | 5/2016 | Sicard | H03K 17/567 |
| | | | 327/109 |
| 2016/0191045 A1* | 6/2016 | Ozono | H01F 7/064 |
| | | | 327/108 |
| 2017/0005585 A1* | 1/2017 | Shimura | H02M 3/33569 |
| 2018/0062500 A1* | 3/2018 | Duman | H02M 1/08 |
| 2018/0167063 A1* | 6/2018 | Akahane | H02M 7/538 |

\* cited by examiner

BOOT STRAP CAPACITOR CHARGING FOR SWITCHING POWER CONVERTERS

TECHNICAL FIELD

This application relates to switching power converters, and more particularly to the charging of boot strap capacitors in switching power converters.

BACKGROUND

The high efficiency of switching power converters such as flyback converters has led to their virtual universal adaption as the battery charger for mobile devices. In a flyback converter, a controller controls the cycling of a power switch transistor that connects between the transformer's primary winding and ground. A rectified AC mains voltage drives the primary winding current when the power switch is cycled on. The rectified AC mains voltage can be several hundred volts such that it can stress the power switch transistor. To minimize the switching stress for the power switch transistor, both quasi-resonant (valley-mode switching) and zero-voltage switching techniques are known. For example, it is known to employ valley switching techniques with regard to the resonant oscillation of the drain voltage for the power switch transistor when it is cycled off. The peak voltages for the resonant oscillation can be relatively robust (as much as 200 V or higher) whereas the minimum voltages (the valleys in the resonant oscillations) are much lower. Valley-mode switching thus involves the detection or prediction of a valley in the resonant oscillations so that the power switch transistor may be switched on at the valley time.

Although valley-mode switching thus lowers the voltage stress on the power switch transistor, note that the valley voltages are not zero but may range from 20 V or even higher such as up to 250 V. This relatively high drain voltage is then discharged to ground when the power switch transistor is cycled on, which lowers efficiency. A more power-efficient alternative to valley-mode switching is zero-voltage-switching (ZVS), which may also be denoted as active clamp operation. In active clamp operation, the leakage energy in the transformer is stored and reclaimed in an active clamp capacitor that is coupled to a terminal for the power switch transistor through an active clamp switch transistor. The active clamp switch transistor is cycled on at the peak of the resonant oscillations, whereupon the drain voltage for the power switch transistor is discharged to ground as the leakage energy is reclaimed. An active clamp architecture thus has no stressing switches at the on-time of the power switch transistor because the on-time is timed to occur when the drain voltage is discharged.

Figure 1:
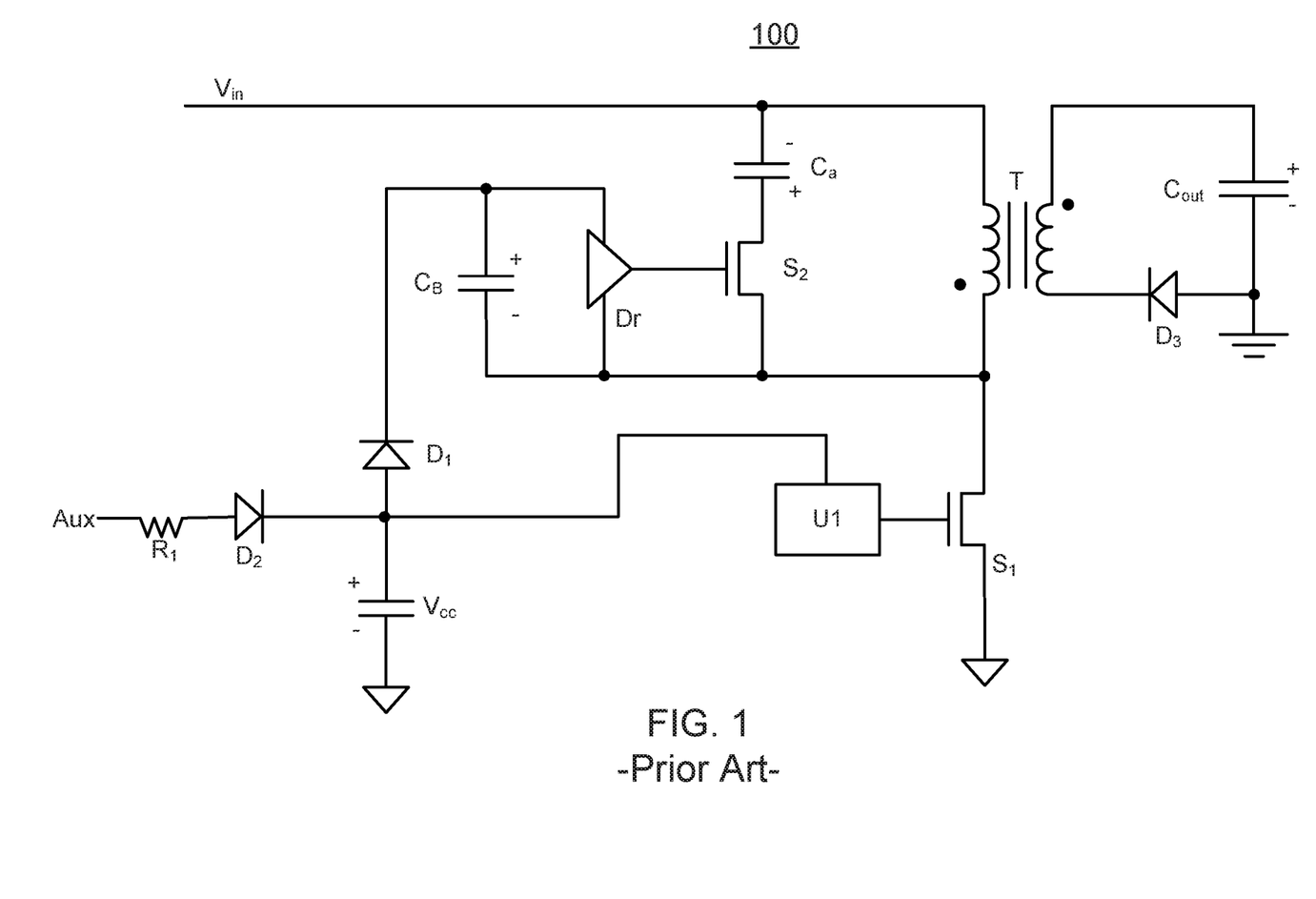
FIG. 1 illustrates a flyback converter having a conventional bootstrap capacitor charging path for charging the bootstrap capacitor that powers the driver of a high-side active clamp switch.

Although active clamp operation is thus advantageous, switching of the active clamp switch requires an appropriate driver. It is conventional to power the driver of the active clamp switch transistor using charge from a boot strap capacitor that in turn is charged by a power supply voltage VCC from a power supply capacitor. An example flyback converter 100 is shown in FIG. 1. A controller U1 controls the switching of a power switch transistor S1 to regulate an output voltage stored on an output capacitor Cout. Power switch transistor S1 has a drain terminal connected to a primary winding of a transformer T so that an input voltage Vin forces a magnetizing current to flow in the primary winding. During this on-time of power switch transistor S1, an output diode D3 prevents a current from flowing in a secondary winding of the transformer. This rectification may also be performed by a synchronous rectifier switch transistor in alternative implementations. When controller U1 cycles off power switch transistor S1, the output diode D3 becomes forward biased so that the secondary current flows to charge the output capacitor Cout with the output voltage. The drain of power switch transistor S1 is charged high while power switch transistor S1 is off. Similarly, an auxiliary winding (not illustrated) is also charged high when power switch transistor S1 is off. To harvest this energy to support the power supply voltage VCC, the auxiliary winding (Aux) couples through a current-limiting resistor R1 and a power supply diode D2 to charge a power supply capacitor VCC with the power supply voltage VCC.

The power supply voltage VCC also powers a driver Dr for an active clamp switch transistor S2 that couples between the drain of power switch transistor S1 and an active clamp capacitor Ca that in turn couples to the input power rail supplying the input voltage Vin. In particular, a diode D1 couples the power supply voltage VCC to a bootstrap capacitor $C_B$. The resulting voltage from the bootstrap capacitor $C_B$ powers driver Dr so that active clamp operation may be achieved. But as the switching frequency for power switch transistor S1 reduces during low load operation, the charging of power supply capacitor VCC is reduced so that the power supply voltage drops accordingly. The voltage across the bootstrap capacitor for powering driver Dr may then be too low such that active clamp operation is lost, causing additional switching loss, voltage spike, and electromagnetic interference (EMI) issues. In particular, the leakage inductance energy that would ordinarily be released may accumulate on active clamp capacitor Ca. The resulting voltage rise across active clamp capacitor Ca may damage it and cause safety issues. Additional circuitry is thus needed to avoid breakdown of active clamp capacitor Ca during low-frequency operation, which adds to component count and increases cost.

Accordingly, there is a need in the art for improved active clamp operation for flyback converters.

SUMMARY

To address the need in the art for improved active clamp operation for flyback converters, a low-frequency charging path is provided for the bootstrap capacitor that powers the active clamp switch transistor. This low-frequency charging path is in addition to the conventional high-frequency charging path that conducts charge from the power supply capacitor to charge the bootstrap capacitor. This conventional charging path is denoted as a "high-frequency" charging path since it provides the bulk of the bootstrap capacitor charging during periods of relatively-high load while the power switch transistor is cycled at a corresponding relatively-high rate. But as noted earlier, the efficiency of the conventional charging path becomes problematic during periods of light load while the power switch transistor is cycled at a corresponding relatively-low rate. In contrast, the low-frequency charging path conducts charge from the active clamp capacitor to charge the bootstrap capacitor. In comparison to the high-frequency charging path, the low-frequency charging path conducts less charge. But during light load operation, such a relatively small amount of charge is ample to keep the bootstrap capacitor charged. As a result, active clamp operation is maintained in both high and low frequency modes of operation, which increases efficiency and reliability.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To support active clamp operation during both high and low load states for a flyback converter with active clamp (zero voltage switching) operation, two charging paths are provided for a bootstrap capacitor that stores a supply voltage for powering a driver for the active clamp switch transistor. A first one of this charging paths is conventional such as discussed with regard to FIG. 1. In particular, a controller U1 as shown for a flyback converter 200 of FIG. 2 controls the switching of a power switch transistor S1 to regulate an output voltage stored on an output capacitor (not illustrated) on the secondary side of the transformer T. Power switch transistor S1 has a drain terminal connected to a primary winding of transformer T so that an input voltage Vin forces a magnetizing current to flow in the primary winding. During this on-time of power switch transistor S1, an output diode D3 (not illustrated) prevents a current from flowing in a secondary winding of the transformer. This rectification may also be performed by a synchronous rectifier switch transistor in alternative implementations. While the output capacitor (not illustrated) on the secondary side of the transformer T is charged, an active clamp capacitor Ca is also charged through the switching on of an active clamp switch transistor S2 so that active clamp capacitor Ca is charged to a voltage that is greater than the input voltage Vin. When controller U1 cycles off power switch transistor S1, the output diode D3 becomes forward biased so that the secondary current flows to charge the output capacitor with the output voltage. As discussed with regard to FIG. 1, an auxiliary winding (Aux) is charged high when power switch transistor S1 is switched off. To harvest this energy to support the power supply voltage VCC, the auxiliary winding couples through a current-limiting resistor R1 and a power supply diode D2 to charge a power supply capacitor VCC with the power supply voltage VCC.

Figure 2:
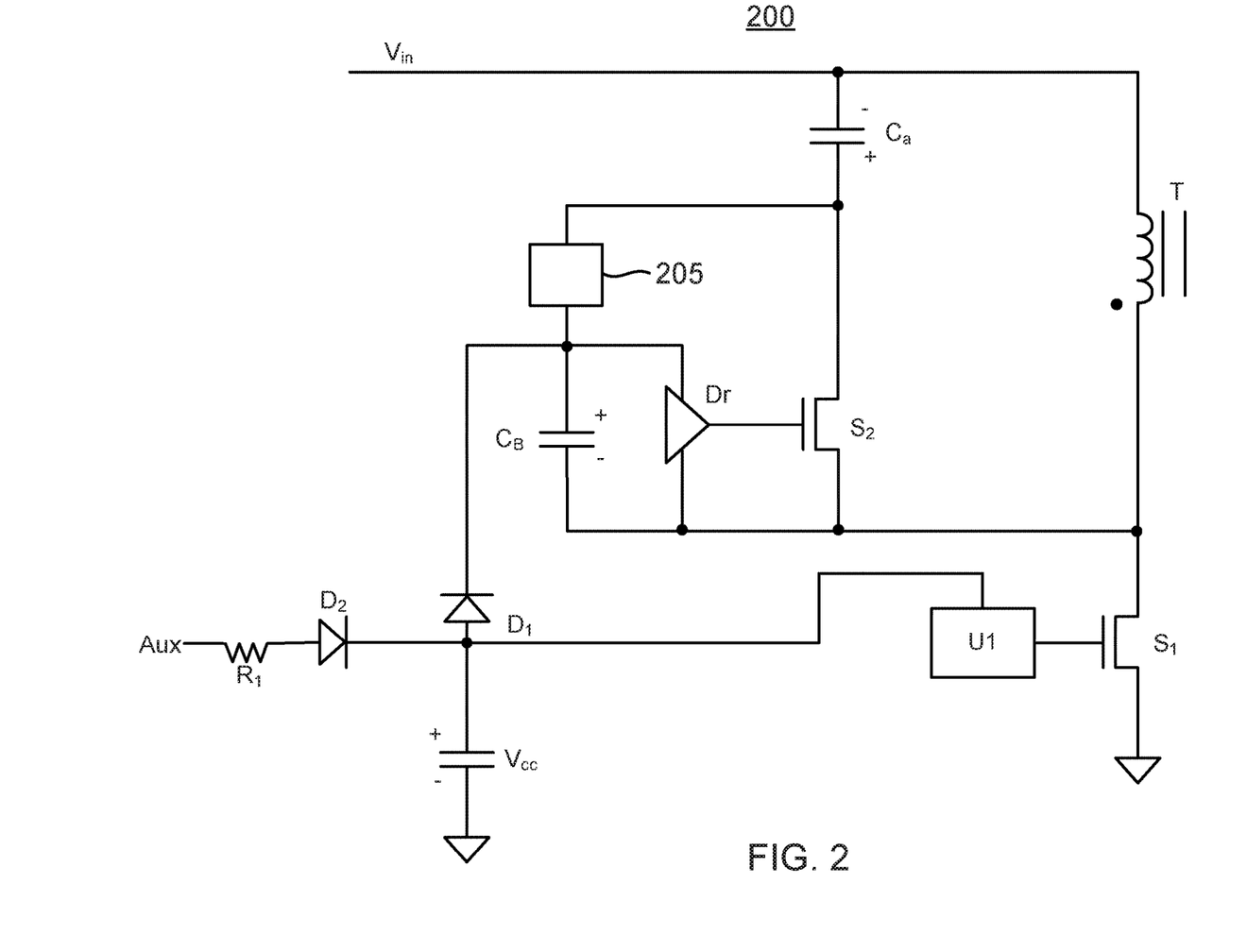
FIG. 2 illustrates a flyback converter having an improved bootstrap capacitor charging path for charging the bootstrap capacitor that powers the driver of an NMOS high-side active clamp switch transistor that couples to an input voltage rail through an active clamp capacitor.

The power supply voltage VCC powers a driver Dr for active clamp switch transistor S2. Active clamp transistor S2 couples between the drain of power switch transistor S1 and a positive plate for active clamp capacitor Ca. Active clamp capacitor Ca in turn couples to the input power rail supplying the input voltage Vin. As part of the first charging path, a diode D1 is forward biased by the power supply voltage VCC so as to charge a driver power supply voltage across a bootstrap capacitor $C_B$. The resulting driver power supply voltage from bootstrap capacitor $C_B$ powers driver Dr so that active clamp operation may be achieved by switching on and off active clamp switch transistor S2 as known in the active clamp operation arts. But as discussed earlier, the charging of the driver power supply voltage through this conventional high-switching-frequency VCC path depends upon the switching frequency. During low load states in which the switching frequency of power switch transistor S1 is reduced to prevent the output voltage from going out of regulation, the current draw of driver Dr may be such that the driver power supply voltage drops too low to support active clamp operation. Without active clamp operation, the efficiency during these low load states drops due to switching losses. In addition, the voltage spike across the power switch transistor may cause damage and also EMI issues. Similarly, the voltage across active clamp capacitor Ca may my rise to dangerous levels due to the loss of the active clamp operation. To maintain active clamp operation, flyback converter 200 includes a low-switching-frequency charge path circuit 205 that either passively or actively controls a flow of charge from active clamp capacitor Ca to bootstrap capacitor $C_B$ to maintain the driver power supply voltage even while the switching frequency for power switch transistor S1 is reduced during low load states for flyback converter 200. A positive plate for bootstrap capacitor $C_B$ couples to charge path circuit 205 and to the driver power supply voltage input for driver Dr. A negative plate for bootstrap capacitor $C_B$ connects to the source of active clamp switch transistor S2 and to the drain of power switch transistor S1.

Figure 3:
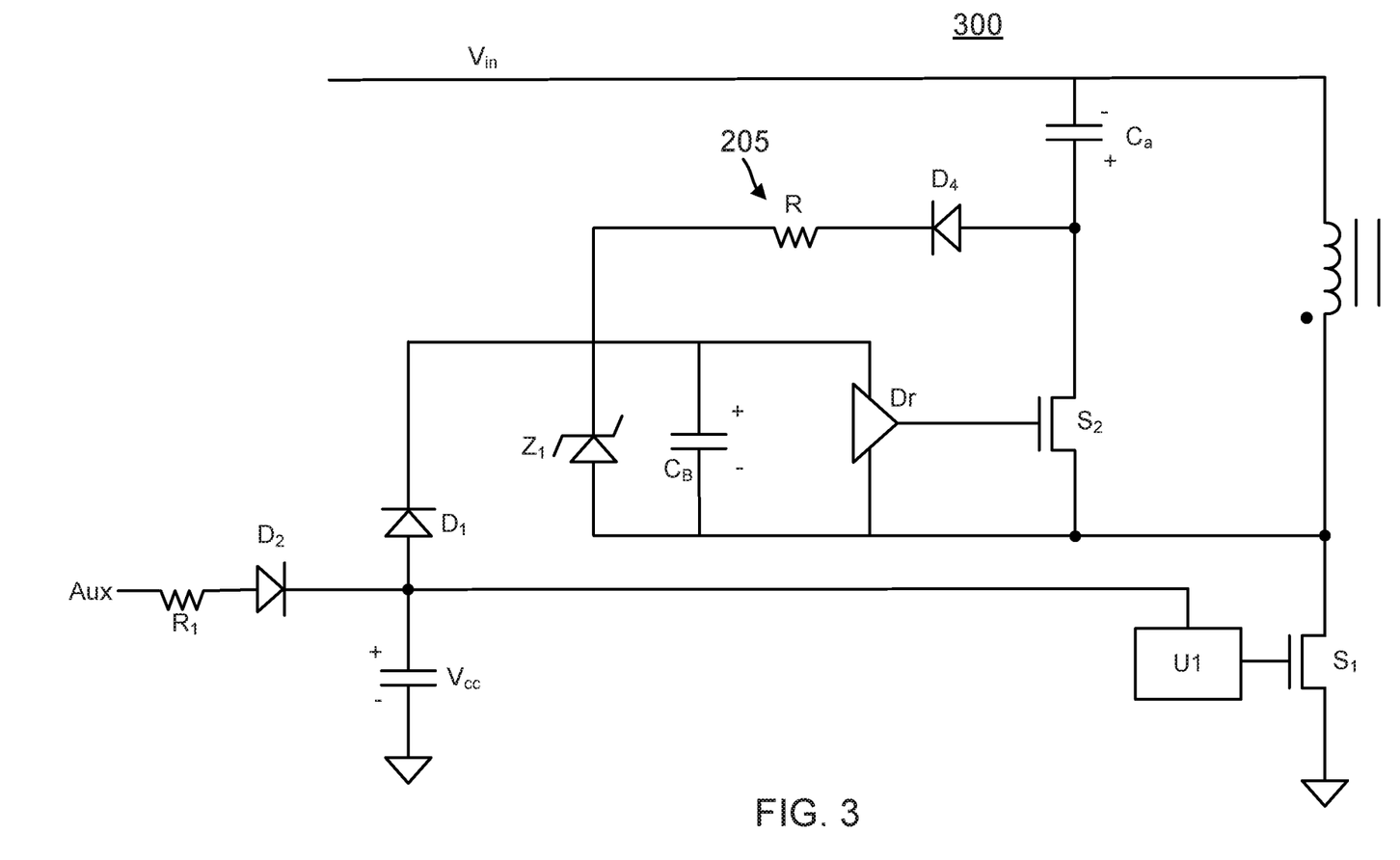
FIG. 3 shows the flyback converter of FIG. 2 in which the improved bootstrap capacitor charging path comprises a resistor.

Charge path circuit 205 may comprise an active circuit or comprise a passive resistor. An example flyback converter 300 in which charge path circuit 205 comprises a resistor R is shown in FIG. 3. To assist the desired charging of bootstrap capacitor $C_B$, resistor R may be in series with a diode D4. The serial combination of resistor R and diode D4 couples between active clamp capacitor Ca and bootstrap capacitor $C_B$. In particular, the serial combination of resistor R and diode D4 couples between the positively-charged plate of active clamp capacitor Ca and the positively-charged plate of bootstrap capacitor $C_B$. It will be appreciated that diode D4 may be omitted in alternative embodiments such that resistor R would directly couple between the positively charged plates for bootstrap capacitor $C_B$ and active clamp capacitor Ca. The secondary side of transformer T is not shown in FIG. 3 for illustration clarity.

A zener diode Z1 may couple across bootstrap capacitor $C_B$ to prevent an overcharging of the driver power supply voltage. With regard to this charging of the driver power supply voltage, note that resistor R provides a bootstrap capacitor charging path regardless of whether power switch transistor S1 is on or off. Should power switch transistor S1 be on, the charging path extends from active clamp capacitor Ca through charge path circuit 205, bootstrap capacitor $C_B$, and power switch transistor S1 to ground. While power switch transistor S1 is on, the voltage across charging path circuit 205 is Vin plus the voltage across the active clamp capacitor Ca. The voltage across charging path circuit 205 is thus approximately Vin+nVout while power switch transistor S1 is on, where Vin is the input voltage, Vout is the output voltage, and n is the turns ratio for transformer T. Should power switch transistor S1 be off, the charging path extends from the active clamp capacitor Ca through charge path circuit 205, bootstrap capacitor $C_B$ and the primary winding of transformer T1. While power switch transistor S1 is off, the voltage across charging path circuit 205 is approximately nVout. Resistor R limits the charging current to be relatively small such as tens of micro-amps. But driver Dr may consume tens of milli-amps during high frequency switching such that the conventional charging path from the positive plate of power supply capacitor VCC through diode D1 to the positive plate of the bootstrap capacitor $C_B$ would dominate the charging of the driver power supply voltage during high frequency operation.

Figure 4:
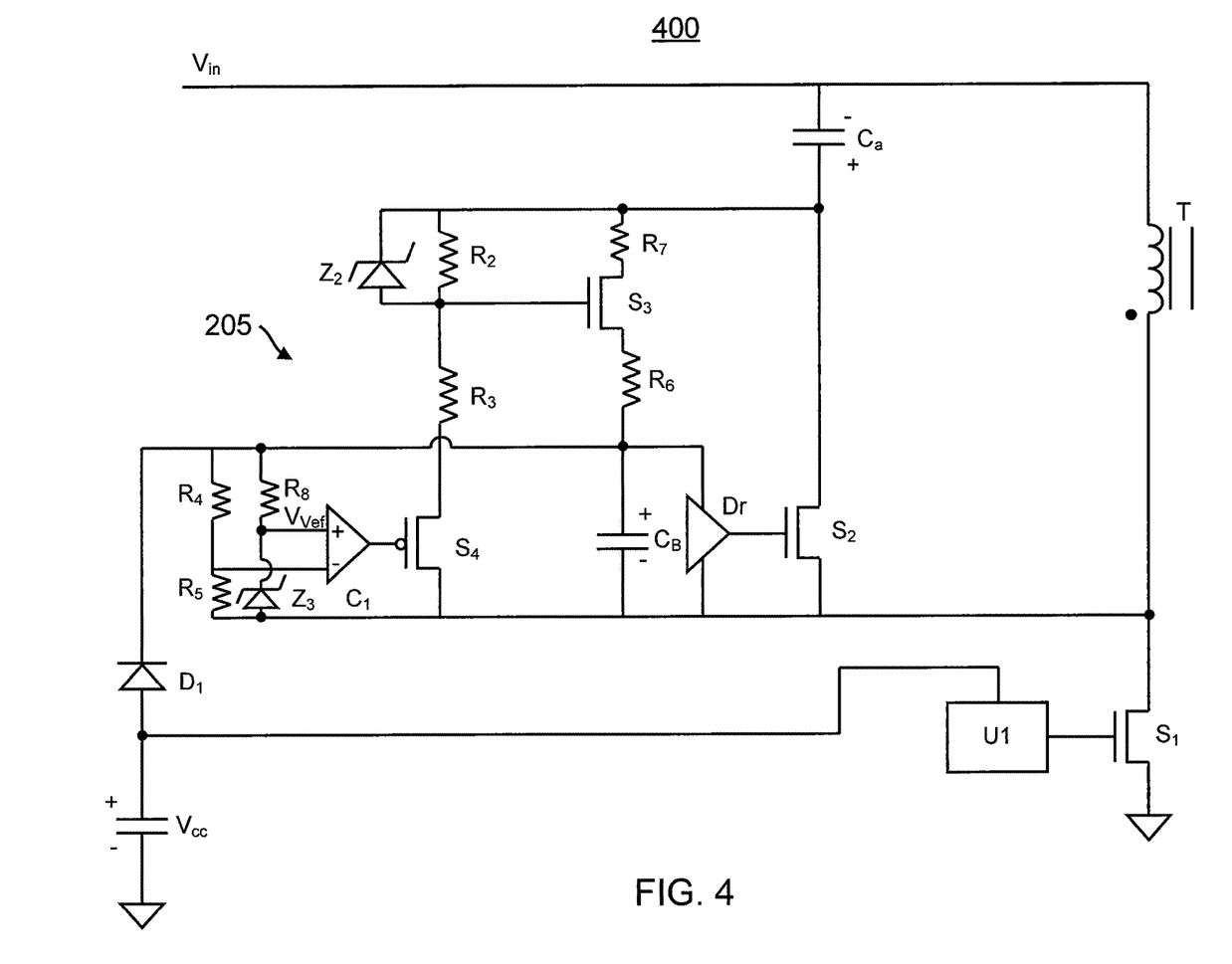
FIG. 4 shows the flyback converter of FIG. 2 in which the improved bootstrap capacitor charging path is actively regulated.

Although resistor R discharges energy through resistive loss while the driver Dr switches active clamp switch transistor S2 and thus consumes a driver current supplied through resistor R to maintain the driver power supply voltage, note that this driver current is relatively small should the driver Dr be implemented using silicon technology. In particular, note that the driver Dr current consumption varies depending upon whether it is quiescent (the active clamp switch transistor S2 not switching) or whether it is active such that the driver Dr is driving the active clamp switch transistor S2 on/off in every switching cycle. The quiescent current consumption is typically small for a CMOS embodiment. In such a case, the losses introduced by resistor R are relatively small. But should driver Dr of active clamp switch transistor S2 be implemented using, e.g., GaN technology, the quiescent current consumption is higher such that the driver Dr consumes substantially more current making the losses from resistor R more appreciable. An active circuit embodiment for charge path circuit 205 in which the charge path circuit 205 comprises an NMOS transistor S3 such as shown in FIG. 4 for a flyback converter 400 avoids such resistive losses. The secondary side of transformer T1 is not shown in FIG. 4 for illustration clarity. A PMOS transistor S4 having a drain connected to the drain of power switch transistor S1 controls whether the transistor S3 is on or off. A source of the transistor S3 couples through a resistor R6 to the positive plate of bootstrap capacitor $C_B$. A drain of transistor S3 couples through a resistor R7 to the positive plate of active clamp capacitor Ca. Thus, when transistor S3 is cycled on, a charging path is activated from active clamp capacitor Ca through resistor R7, transistor S3, and resistor R7 to charge bootstrap capacitor $C_B$. In particular, transistor S3 is cycled on in response to transistor S4 being cycled on. The source of transistor S4 couples through a voltage divider formed by a serial pair of resistors R3 and R4 to the positive plate of active clamp capacitor Ca. A node between resistors R4 and R4 drives the gate of transistor S3. Should transistor S4 be on, the voltage division through resistors R3 and R4 lowers the gate-to-source voltage for transistor S3 sufficiently to switch transistor S3 on.

A zener diode Z2 arranged in parallel with resistor R2 functions to clamp the gate voltage of transistor S3 to protect it from excessive voltages. To control whether transistor S4 is on or off, a comparator C1 compares a reference voltage Vref to a divided version of the driver power supply voltage stored across bootstrap capacitor $C_B$. A pair of resistors R4 and R5 are arranged in series between the positive plate of bootstrap capacitor $C_B$ and the drain of power switch transistor S1 to provide the divided voltage to comparator C1. A resistor R8 in series with a zener diode Z3 are coupled between the positive plate of bootstrap capacitor $C_B$ and the drain of power switch transistor S1 form the reference voltage as a clamped voltage across the zener diode Z3. Should the driver power supply voltage drop, so will the divided voltage from resistors R4 and R5 such that this divided voltage would drop below the reference voltage supplied by zener diode Z3 so that the output of comparator C1 goes high to switch on transistor S4. Conversely, the output of comparator C1 will be low so that transistor S4 is off if the driver power supply voltage is sufficiently high because in that case the divided voltage from resistors R4 and R5 is greater than the reference voltage. Comparator C1 thus functions to regulate the driver power supply voltage by indirectly controlling whether transistor S3 is on or off. It will be appreciated that charging path circuit 205 in flyback converter 400 may be modified to switch off transistor S3 during high frequency switching operation when the voltage across the bootstrap capacitor $C_B$ reaches an acceptable level. In an alternative embodiment, the controller (not illustrated) that controls the switching of active clamp transistor S2 may be configured to switch transistor S3 responsive to whether the bootstrap capacitor $C_B$ voltage is above or below a threshold level.

Figure 5:
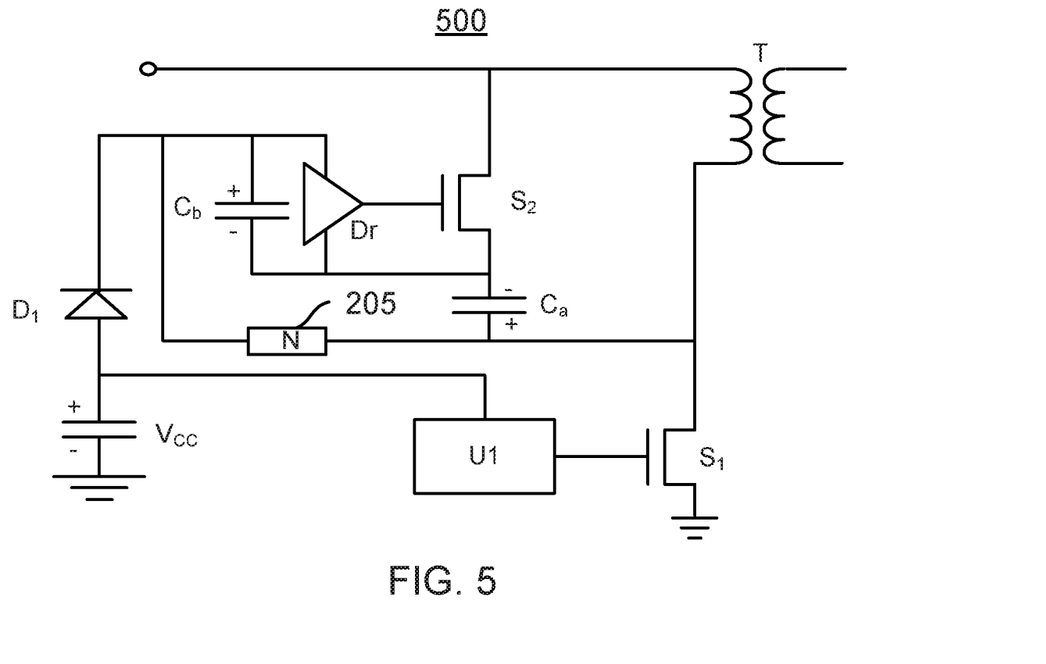
FIG. 5 illustrates a flyback converter having an improved bootstrap capacitor charging path for charging the bootstrap capacitor that powers the driver of an NMOS high-side active clamp switch transistor that directly connects to the input voltage rail.

The positions of active clamp switch transistor S2 and active clamp capacitor Ca may be switched as shown in FIG. 5 for a flyback converter 500. A drain of active clamp switch transistor connects to the input voltage rail. Active clamp capacitor Ca connects between the source of active clamp switch transistor S2 and the drain of power switch transistor S1. Driver Dr, transformer T, bootstrap capacitor $C_B$, controller U1, resistor R1, as well as diodes D1 and D2 are arranged as discussed with regard to flyback converter 200. However, charge path circuit 205 now connects between the positive plate of bootstrap capacitor $C_B$ and the drain of power switch transistor S1.

Figure 6A:
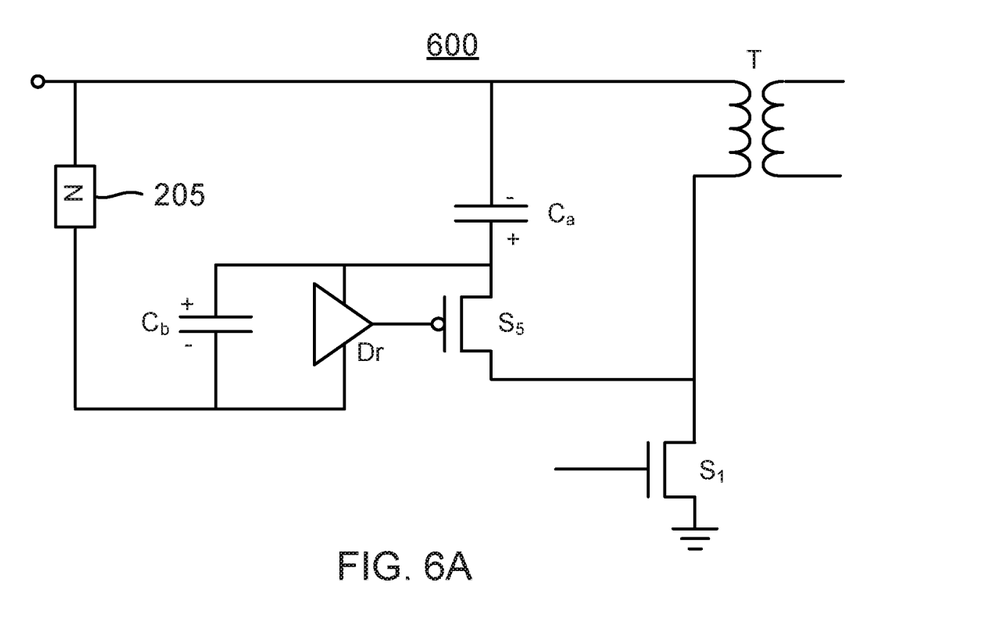
FIG. 6A illustrates a flyback converter having an improved bootstrap capacitor charging path for charging the bootstrap capacitor that powers the driver of a PMOS high-side active clamp switch transistor that couples to an input voltage rail through an active clamp capacitor.
Figure 6B:
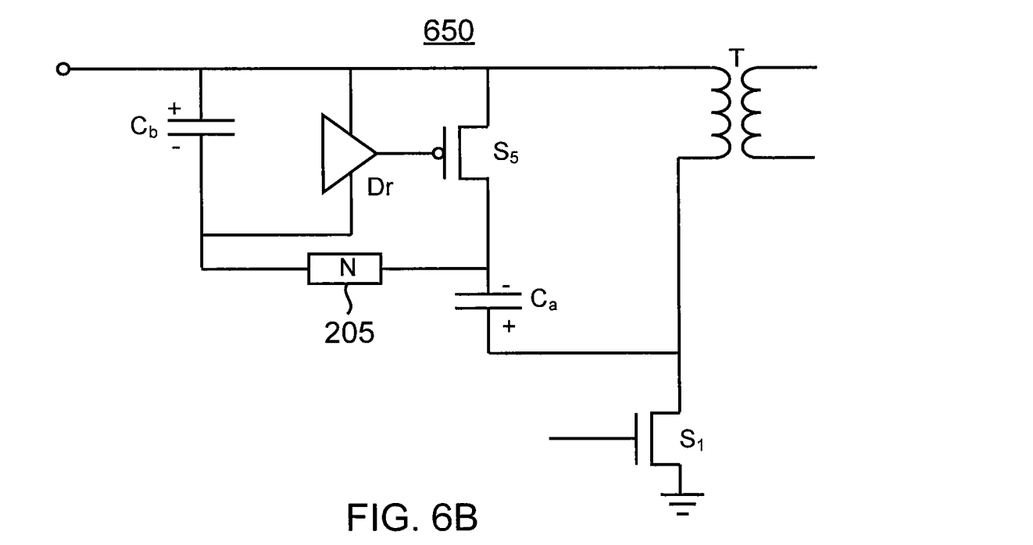
FIG. 6B illustrates a flyback converter having an improved bootstrap capacitor charging path for charging the bootstrap capacitor that powers the driver of a PMOS high-side active clamp switch transistor that directly connects to an input voltage rail.

Flyback converters 500, 400, 300, and 200 are "high side" active clamp embodiments in which active clamp switch transistor S2 is coupled in series with the power switch transistor S1. In flyback converters 200, 300 and 400, active clamp switch transistor S2 has its source tied to the drain of power switch transistor S1 to complete the series connection. In contrast, the source of active clamp transistor S2 couples through active clamp capacitor Ca to the drain of power switch transistor S1 to complete the series connection in flyback converter 500. In all of those embodiments, the active clamp switch transistor is an NMOS transistor. But analogous "high side" active clamp embodiments may be constructed in which the active clamp switch transistor is a PMOS transistor. An example flyback converter 600 is shown in FIG. 6A in which a negative plate for active clamp capacitor Ca connects to the input voltage rail. A PMOS active clamp switch transistor S5 has its source connected to the positive plate of active clamp capacitor Ca and its drain connected to the drain of power switch transistor S1. Transformer T1, driver Dr, and bootstrap capacitor $C_B$ are arranged as discussed with regard to flyback converter 200. Charge path circuit 205 connects between the input voltage rail and the negative plate of bootstrap capacitor $C_B$. In an another PMOS high side embodiment, the positions of active clamp switch transistor S5 and active clamp capacitor Ca may be reversed as shown for a flyback converter 650 of FIG. 6B. The positive plate of bootstrap capacitor $C_B$ connects to the input voltage rail such that the input voltage on the input voltage rail functions as the driver power supply voltage for driver Dr. Charge path circuit 205 connects between the negative plate of bootstrap capacitor $C_B$ and the negative plate of active clamp capacitor Ca. For illustration clarity, the conventional charging path formed by power supply capacitor VCC, diodes D1 and D2, and resistor R1 is not shown in FIGS. 6A and 6B. Similarly, controller U1 is not shown in FIGS. 6A and 6B.

Figure 7A:
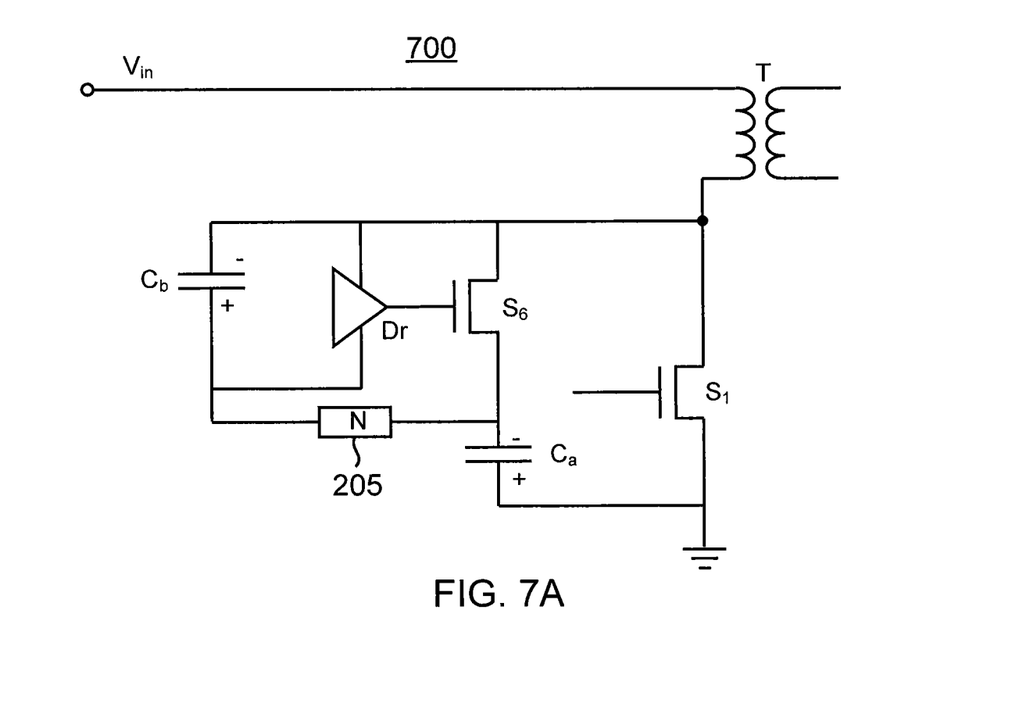
FIG. 7A illustrates a flyback converter having an improved bootstrap capacitor charging path for charging the bootstrap capacitor that powers the driver of an NMOS low-side active clamp switch transistor that couples to ground through an active clamp capacitor.

The previous discussion has been directed to 'high side" active clamp embodiments but the alternative charge path for charging the bootstrap capacitor may also be implemented in "low side" active clamp architectures in which the active clamp capacitor couples to the source of power switch transistor S1. Since the source is ground, such a coupling is low voltage as compared to the higher voltage coupling for the "high side" active clamp architectures. NMOS embodiments for the active clamp switch transistor in a low-side embodiment will be discussed first following by a discussion of PMOS low-side embodiments. An example low-side NMOS flyback converter 700 is shown in FIG. 7A. The negative plate of active clamp capacitor Ca connects to ground/the source of power switch transistor S1 whereas the positive plate of active clamp capacitor Ca connects to the source of an NMOS active clamp switch transistor S6 having a drain connected to the drain of power switch transistor S1. The positive plate of bootstrap capacitor $C_B$ connects through charge path circuit 205 to the positive plate of active clamp capacitor Ca. In a low side embodiment such as flyback converter 700, the voltage across charge path circuit 205 will almost constantly equal Vin+n*Vout.

Figure 7B:
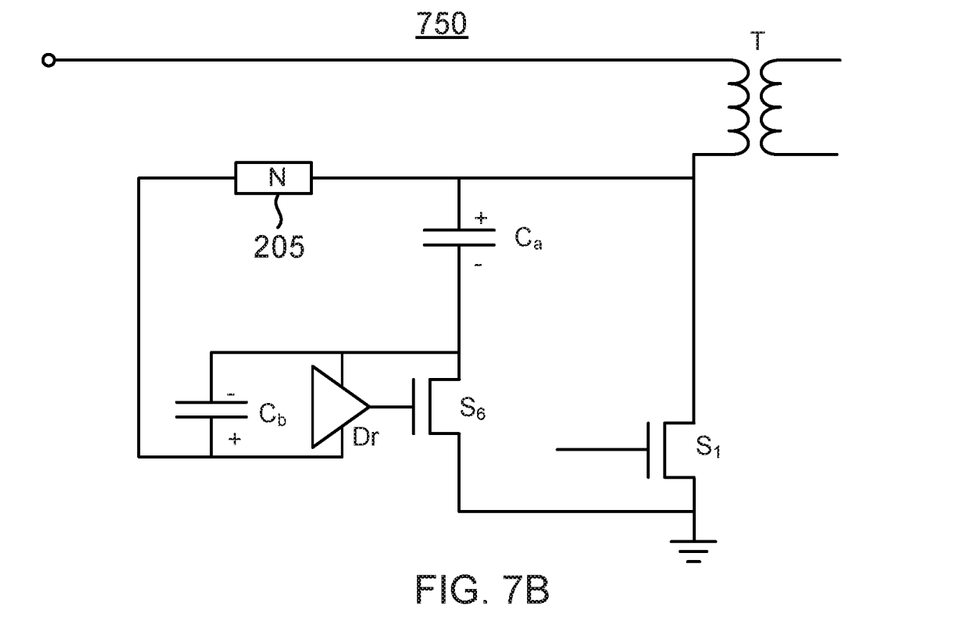
FIG. 7B illustrates a flyback converter having an improved bootstrap capacitor charging path for charging the bootstrap capacitor that powers the driver of an NMOS low-side active clamp switch transistor that couples to ground through an active clamp capacitor.

The positions of active clamp capacitor Ca and active clamp switch transistor S6 may be reversed as shown in FIG. 7B for a flyback converter 750. The positive plate of active clamp capacitor Ca in flyback converter 750 connects to the drain of power switch transistor S1 whereas the negative plate of active clamp capacitor Ca connects to the drain of active clamp switch transistor S6, which has its source connected to ground. Charge path circuit 205 connects between the positive plate of active clamp capacitor Ca and the positive plate of bootstrap capacitor $C_B$.

Figure 8A:
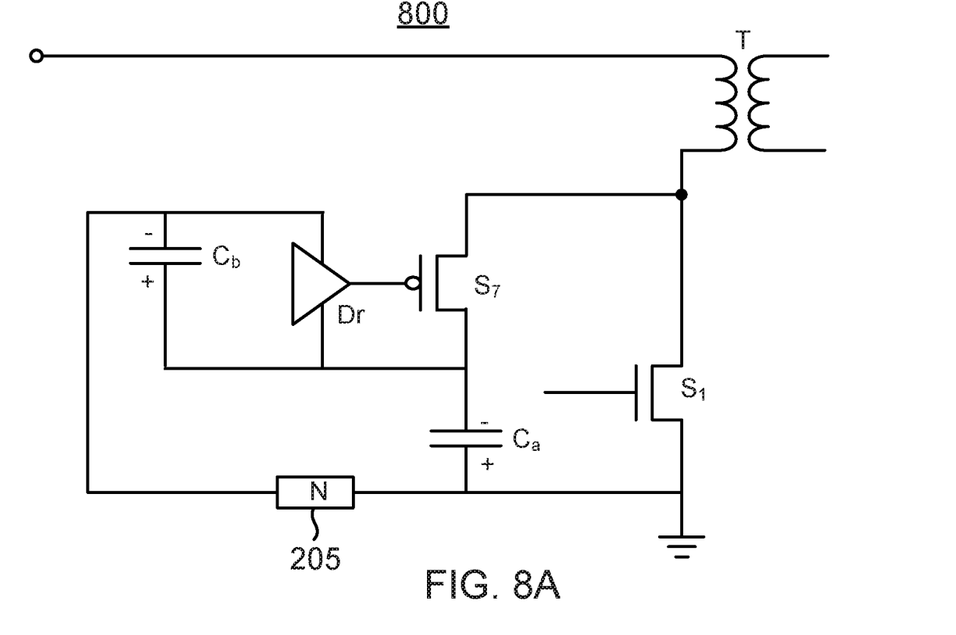
FIG. 8A illustrates a flyback converter having an improved bootstrap capacitor charging path for charging the bootstrap capacitor that powers the driver of a PMOS low-side active clamp switch transistor that that couples to ground through an active clamp capacitor.
Figure 8B:
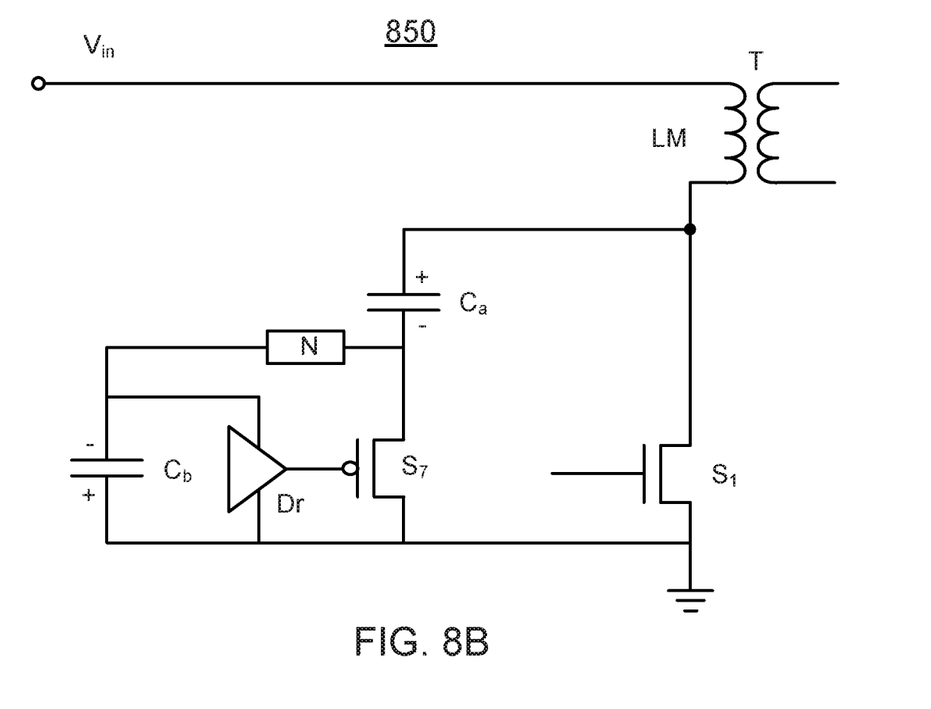
FIG. 8B illustrates a flyback converter having an improved bootstrap capacitor charging path for charging the bootstrap capacitor that powers the driver of a PMOS low-side active clamp switch transistor that directly couples to ground.

A low side PMOS active clamp flyback converter 800 is shown in FIG. 8A. Like the other PMOS embodiments, charge path circuit 205 connects between the negative plate of active clamp capacitor Ca and the negative plate of bootstrap capacitor $C_B$. The negative plate of active clamp capacitor Ca is tied to ground whereas its positive plate is tied to the positive plate of active clamp capacitor $C_B$ and to the source of a PMOS active clamp switch transistor S7. The drain of PMOS active clamp switch transistor S7 connects to the drain of power switch transistor S1 and also to a terminal for transformer primary winding. As compared to flyback converter 800, the positions of active clamp capacitor Ca and active clamp switch transistor S7 are reversed in a flyback converter 850 of FIG. 8B. The drain of active clamp switch transistor S7 is thus now tied to ground whereas its source connects to the negative plate of active clamp capacitor Ca, which has its positive plated connected to the drain of power switch transistor S2. Since it is a PMOS embodiment, charge path circuit 205 connects between the negative plates of bootstrap capacitor $C_B$ and active clamp capacitor Ca. The positive plate of bootstrap capacitor $C_B$ connects to ground. For illustration clarity, the conventional charging path formed by VCC capacitor VCC, diodes D1 and D2, and resistor R1 is not shown in FIGS. 7A, 7B, 8A, and 8B. Similarly, controller U1 is not shown in these figures. Similarly, charge path circuit 205 may be passive or active as discussed with regard to converters 300 and 400.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A flyback converter, comprising:
    an active clamp capacitor;
    an active clamp switch transistor connected to a positive plate of the active clamp transistor;
    a driver configured to drive on and off the active clamp switch transistor;
    a bootstrap capacitor for storing a driver power supply voltage for the driver, wherein the active clamp capacitor has a negative plate connected to a primary winding of a transformer;
    a controller configured to control a switching of a power switch transistor;
    a power supply capacitor for storing a power supply voltage for the controller;
    a first diode coupled between the bootstrap capacitor and the power supply capacitor for coupling charge from the power supply capacitor to charge the bootstrap capacitor; and
    a second diode in series with a resistor connected between the positive plate of the active clamp capacitor and the bootstrap capacitor for coupling charge from the active clamp capacitor to charge the bootstrap capacitor.

2. The flyback converter of claim 1, wherein a terminal of the active clamp switch transistor is coupled to a drain of the power switch transistor.

3. The flyback converter of claim 2, wherein the active clamp switch transistor is an NMOS transistor.

4. The flyback converter of claim 2, wherein the active clamp switch transistor is a PMOS transistor.

5. A method of operation for a flyback converter, comprising:

charging a power supply capacitor to provide a power supply voltage to a controller for the flyback converter;

conducting charge from the power supply capacitor through a diode to charge a bootstrap capacitor to provide a driver power supply voltage for driving an active clamp switch transistor;

switching on a charging transistor responsive to the power supply voltage being less than a threshold voltage to conduct charge from a positive plate of an active clamp capacitor through the charging transistor to charge the bootstrap capacitor; and switching off the charging transistor responsive to the power supply voltage being greater than the threshold voltage.

6. A flyback converter, comprising:

an active clamp capacitor;

an active a bootstrap capacitor for storing a driver power supply voltage for driving an active clamp switch transistor connected to a positive plate of the active clamp capacitor, wherein the active clamp capacitor has a negative plate connected to a primary winding of a transformer;

a power supply capacitor for storing a power supply voltage for a controller for controlling the switching of a power switch transistor;

a diode coupled between bootstrap capacitor and the power supply capacitor for coupling charge from the power supply capacitor to charge the bootstrap capacitor;

a charging transistor coupled between the positive plate of the active clamp capacitor and a positive plate of the bootstrap capacitor; and a control circuit configured to switch on the charging transistor to charge the bootstrap capacitor responsive to the power supply voltage for the controller being less than a reference voltage.

7. The flyback converter of claim 6, wherein the reference voltage is a breakdown voltage of a zener diode.

8. The flyback converter of claim 7, wherein the control circuit comprises a comparator.

\* \* \* \* \*

UNITED STATES PATENT AND TRADEMARK OFFICE
CERTIFICATE OF CORRECTION

| | |
|---|---|
| PATENT NO. | : 10,742,121 B2 |
| APPLICATION NO. | : 16/024659 |
| DATED | : August 11, 2020 |
| INVENTOR(S) | : Wenduo Liu and Cong Zheng |

It is certified that error appears in the above-identified patent and that said Letters Patent is hereby corrected as shown below:

In the Claims

Column 9, At Claim 6, Line 3: Please delete "an active".

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*